US008783712B2

(12) United States Patent
Fukushima et al.

(10) Patent No.: US 8,783,712 B2
(45) Date of Patent: Jul. 22, 2014

(54) SIDE AIRBAG DEVICE FOR VEHICLE

(71) Applicants: Satoshi Fukushima, Toyota (JP); Shigeki Hayashi, Kasugai (JP); Shinobu Tanaka, Toyota (JP)

(72) Inventors: Satoshi Fukushima, Toyota (JP); Shigeki Hayashi, Kasugai (JP); Shinobu Tanaka, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/956,655

(22) Filed: Aug. 1, 2013

(65) Prior Publication Data

US 2014/0035264 A1     Feb. 6, 2014

(30) Foreign Application Priority Data

Aug. 2, 2012   (JP) ................. 2012-172349

(51) Int. Cl.
 *B60R 21/16*  (2006.01)
(52) U.S. Cl.
 USPC ............... 280/730.2; 280/743.1; 280/743.2
(58) Field of Classification Search
 USPC ............... 280/730.2, 743.1, 743.2
 See application file for complete search history.

(56) References Cited

U.S. PATENT DOCUMENTS

| 6,364,348 | B1 * | 4/2002 | Jang et al. ............... 280/730.2 |
| 6,378,896 | B1 * | 4/2002 | Sakakida et al. ......... 280/730.2 |
| 7,357,411 | B2 * | 4/2008 | Kurimoto et al. ......... 280/729 |
| 7,900,957 | B2 * | 3/2011 | Honda ...................... 280/729 |
| 8,356,835 | B2 * | 1/2013 | Yamamoto ............... 280/730.2 |
| 2004/0124615 | A1 * | 7/2004 | Tanase et al. ............ 280/730.2 |
| 2006/0001244 | A1 * | 1/2006 | Taguchi et al. .......... 280/729 |
| 2006/0131847 | A1 * | 6/2006 | Sato et al. ............... 280/730.2 |
| 2010/0140906 | A1 * | 6/2010 | Honda et al. ............ 280/730.2 |
| 2011/0001308 | A1 * | 1/2011 | Shibayama et al. ...... 280/729 |
| 2012/0200072 | A1 |  8/2012 | Fukawatase et al. |

FOREIGN PATENT DOCUMENTS

| JP | A-2007-261500 | 10/2007 |
| JP | A-2008-201172 | 9/2008 |
| JP | A-2008-201175 | 9/2008 |
| JP | A-2010-208434 | 9/2010 |
| JP | A-2011-240807 | 12/2011 |
| JP | A-2012-162136 | 8/2012 |
| WO | WO 2013/157082 A1 | 10/2013 |
| WO | WO 2013/183130 A1 | 12/2013 |

\* cited by examiner

*Primary Examiner* — Toan To
(74) *Attorney, Agent, or Firm* — Oliff PLC

(57) ABSTRACT

A side airbag device for a vehicle includes a gas generating device, a side airbag in which a front and a rear bag portions are defined by a front-rear partition section having a front-rear communication opening, gas supplied from the gas generating device into the rear bag portion is supplied into the front bag portion through the front-rear communication opening to allow the side airbag to be inflated and deployed from an outside portion in a vehicle width direction of a seat back, and the front bag portion is arranged on a vehicle front side of the rear bag portion in an inflated and deployed state, and an extending member provided in the rear bag portion and extended in the inflated and deployed state to restrict inflation of the rear bag portion in a vehicle fore-and-aft direction and enlarges inflation of the rear bag portion in the vehicle width direction.

8 Claims, 10 Drawing Sheets

SIDE AIRBAG DEVICE FOR VEHICLE

INCORPORATION BY REFERENCE

The disclosure of Japanese Patent Application No. 2012-172349 filed on Aug. 2, 2012 including the specification, drawings and abstract is incorporated herein by reference in its entirety.

BACKGROUND OF THE INVENTION

1. Field of the Invention

The present invention relates to a side airbag device for a vehicle.

2. Description of Related Art

Japanese Patent Application Publication No. 2011-240807 (JP 2011-240807 A) discloses a side airbag device for an automobile that includes a bag main body (side airbag) having two chambers of front and rear portions in which a front portion (front bag portion) and a rear portion (rear bag portion) are defined by a partition wall (front-rear partitioning section). The side airbag is configured to form a general V shape in a plan view by the front bag portion and the rear bag portion that can contacts with and applies pressure to an occupant in an oblique direction toward an approximate chest position of the occupant in an inflated and deployed state. This allows the upward curve of chest displacement to have a mild slope, the period required for the curve to reach the maximum value to be long, and the value to be low.

In such a side airbag as described above, the position of the front-rear partition section is determined in accordance with an inflation width of the rear bag portion in the vehicle fore-and-aft direction. Further, the inflation width of the rear bag portion in the vehicle fore-and-aft direction varies depending on an inflation width of the rear bag portion in the vehicle width direction. In other words, when gas is supplied into the rear bag portion, the pressure of the gas is uniformly applied to an inner surface of the rear bag portion. Therefore, when the inflation width of the rear bag portion in the vehicle width direction is changed, the inflation width of the rear bag portion in the vehicle fore-and-aft direction changes. In other words, the position of the front-rear partition section in the vehicle fore-and-aft direction varies. In order to prevent this circumstance, the degree of freedom in setting of the inflation width of the rear bag portion in the vehicle width direction has to be decreased. Accordingly, there is room for improvement in initial occupant restraining performance of the side airbag.

SUMMARY OF THE INVENTION

The present invention provides a side airbag device for a vehicle which can improve initial occupant restraining performance of a side airbag in which a front bag portion and a rear bag portion are partitioned from each other by a front-rear partition section.

A first aspect of the present invention relates to a side airbag device for a vehicle. The side airbag device for a vehicle includes: a gas generating device which is actuated to generate gas; a side airbag in which a front bag portion and a rear bag portion are defined by a front-rear partition section having a front-rear communication opening, gas supplied from the gas generating device into the rear bag portion is supplied into the front bag portion through the front-rear communication opening to allow the side airbag to be inflated and deployed from an outside portion in a vehicle width direction of a seat back of a vehicle seat, and the front bag portion is arranged on a vehicle front side of the rear bag portion in an inflated and deployed state; and an extending member which is provided in the rear bag portion and extended in the inflated and deployed state to restrict inflation of the rear bag portion in a vehicle fore-and-aft direction and thereby enlarges the inflation width of the rear bag portion in the vehicle width direction.

According to the aspect, when the gas generating device is actuated, gas is supplied into the rear bag portion of the side airbag, and gas is supplied into the front bag portion through the front-rear communication opening provided in the front-rear partition section. The side airbag is thereby inflated and deployed from the outside portion in the vehicle width direction of the seat back of the vehicle seat toward the vehicle front. In the inflated and deployed state, the front bag portion is arranged on the vehicle front side of the rear bag portion. Accordingly, the occupant seated on the vehicle seat can be restrained from the outside in the vehicle width direction by the front bag portion and the rear bag portion.

Here, in order to improve initial occupant restraining performance of the side airbag, it is effective to allow the front-rear partition section set between the front bag portion and the rear bag portion to face a central portion in the fore-and-aft direction (a portion protruding to an outermost position in the vehicle width direction) of a side surface of a chest and thereby to reduce the load to the chest and at the same time to rapidly restrain a rear half portion of the chest (a portion on a back side) that has relatively high load resistance.

In this point, in the first aspect of the present invention, when the side airbag is inflated and deployed, the extending member provided in the rear bag portion is extended to restrict inflation of the rear bag portion in the vehicle fore-and-aft direction, thereby enlarging the inflation width of the rear bag portion in the vehicle width direction. Accordingly, if the extending member is set such that the front-rear partition section faces the central portion in the fore-and-aft direction on the side surface of the chest of the occupant, the rear bag portion whose inflation width in the vehicle width direction is enlarged by the extending member can rapidly contact with the rear half portion of the chest. This allows an improvement in the initial occupant restraining performance of the side airbag. In addition, this can be achieved by such a small change as setting the extending member in the rear bag portion and thus achieved in a simple configuration.

A second aspect of the present invention relates to a side airbag device for a vehicle. The side airbag device for a vehicle includes: a gas generating device which is actuated to generate gas; and a side airbag in which a rear main body which is included in a rear bag portion and a front bag portion are partitioned from each other by a front-rear partition section having a front-rear communication opening, an inside sub-bag portion and the rear main body that are included in the rear bag portion are defined by a right-left partition section having a right-left communication opening, gas supplied from the gas generating device into the rear main body is supplied to the front bag portion through the front-rear communication opening and supplied into the inside sub-bag portion through the right-left communication opening to allow the side airbag to be inflated and deployed from an outside portion in a vehicle width direction of a seat back of a vehicle seat toward a vehicle front, the front bag portion is arranged on a vehicle front side of the rear main body in an inflated and deployed state, and the inside sub-bag portion is arranged inside of the rear main body in the vehicle width direction.

According to the aspect, when the gas generating device is actuated, gas is supplied into the rear main body in the rear bag portion of the side airbag, gas is supplied into the front bag portion through the front-rear communication opening provided in the front-rear partition section, and gas is supplied into the inside sub-bag portion through the right-left communication opening provided in the right-left partition section. The side airbag is thereby inflated and deployed from the outside portion in the vehicle width direction of the seat back of the vehicle seat toward the vehicle front. In the inflated and deployed state, the front bag portion is arranged on the vehicle front side of the rear main body, and the inside sub-bag portion is arranged inside of the rear main body in the vehicle width direction. Accordingly, the occupant seated on the vehicle seat can be restrained from the outside in the vehicle width direction by the front bag portion and the rear bag portion (the rear main body and the inside sub-bag portion).

Here, in order to improve initial occupant restraining performance of the side airbag, it is effective to allow the front-rear partition section set between the front bag portion and the rear main body (the rear bag portion) to face the central portion in the fore-and-aft direction (the portion protruding to the outermost position in the vehicle width direction) of the side surface of the chest and thereby to reduce the load to the chest and at the same time to rapidly restrain the rear half portion of the chest (the portion on the back side) that has relatively high load resistance.

In this point, in the second aspect of the present invention, if the front-rear partition section is set to face the central portion in the fore-and-aft direction on the side surface of the chest of the occupant in the inflated and deployed state of the side airbag, the inside sub-bag portion which is inflated and deployed inward of the rear main body in the vehicle width direction can rapidly contact with the rear half portion of the chest. This allows an improvement in the initial occupant restraining performance of the side airbag.

A third aspect of the present invention relates to a side airbag device for a vehicle. The side airbag device for a vehicle includes: a gas generating device which is actuated to generate gas; and a side airbag in which a rear main body which is included in a rear bag portion and a front bag portion are partitioned from each other by a front-rear partition section having a front-rear communication opening, gas supplied from the gas generating device into the rear main body is supplied into the front bag portion through the front-rear communication opening to allow the side airbag to be inflated and deployed from an outside portion in a vehicle width direction of a seat back of a vehicle seat toward a vehicle front, the front bag portion is arranged on a vehicle front side of the rear main body in an inflated and deployed state, and an inside sub-bag portion to which gas is directly supplied from the gas generating device and which is inflated and deployed inward of the rear main body in the vehicle width direction is provided in the rear bag portion.

According to the aspect, when the gas generating device is actuated, gas is supplied into the rear main body in the rear bag portion of the side airbag, and gas is supplied into the front bag portion through the front-rear communication opening provided in the front-rear partition section. The side airbag is thereby inflated and deployed from the outside portion in the vehicle width direction of the seat back of the vehicle seat toward the vehicle front. In the inflated and deployed state, the front bag portion is arranged on the vehicle front side of the rear main body in the rear bag portion. Accordingly, the occupant seated on the vehicle seat can be restrained from the outside in the vehicle width direction by the front bag portion and the rear bag portion.

Here, in order to improve initial occupant restraining performance of the side airbag, it is effective to allow the front-rear partition section set between the front bag portion and the rear main body (the rear bag portion) to face the central portion in the fore-and-aft direction (the portion protruding to the outealiost position in the vehicle width direction) of the side surface of the chest and thereby to reduce the load to the chest and at the same time to rapidly restrain the rear half portion of the chest (the portion on the back side) that has relatively high load resistance.

In this point, in the third aspect of the present invention, the rear bag portion of the side airbag has the inside sub-bag portion to which gas is directly supplied from the gas generating device and which is inflated and deployed inward of the rear main body in the vehicle width direction. Accordingly, if the front-rear partition section is set to face the central portion in the fore-and-aft direction on the side surface of the chest of the occupant in the inflated and deployed state of the side airbag, the inside sub-bag portion which is inflated and deployed inward of the rear main body in the vehicle width direction can rapidly contact with the rear half portion of the chest. This allows an improvement in the initial occupant restraining performance of the side airbag. In addition, as described above, because gas is directly supplied from the gas generating device into the inside sub-bag portion, an inflation and deployment time point of the inside sub-bag portion can easily be controlled, thus enabling rapid restraint of the rear half portion of the chest.

A fourth aspect of the present invention relates to a side airbag device for a vehicle. The side airbag device for a vehicle includes: a gas generating device which is actuated to generate gas; and a side airbag in which a front bag portion and a rear bag portion are defined by a front-rear partition section having a front-rear communication opening, gas supplied from the gas generating device into a rear bag portion is supplied into a front bag portion through the front-rear communication opening to allow the side airbag to be inflated and deployed from an outside portion in a vehicle width direction of a seat back of a vehicle seat, and the front bag portion is arranged on a vehicle front side of the rear bag portion in an inflated and deployed state; and an inflation width enlarging section which is provided in the side airbag, restricts a position of the front-rear partition section in a vehicle fore-and-aft direction in the inflated and deployed state, and enlarges an inflation width of the rear bag portion in the vehicle width direction.

According to the aspect, when the gas generating device is actuated, gas is supplied into the rear bag portion of the side airbag, and gas is supplied into the front bag portion through the front-rear communication opening provided in the front-rear partition section. The side airbag is thereby inflated and deployed from the outside portion in the vehicle width direction of the seat back of the vehicle seat toward the vehicle front. In the inflated and deployed state, the front bag portion is arranged on the vehicle front side of the rear bag portion. Accordingly, the occupant seated on the vehicle seat can be restrained from the outside in the vehicle width direction by the front bag portion and the rear bag portion.

Here, in order to improve initial occupant restraining performance of the side airbag, it is effective to allow the front-rear partition section set between the front bag portion and the rear bag portion to face the central portion in the fore-and-aft direction (the portion protruding to the outermost position in the vehicle width direction) of the side surface of the chest and thereby to reduce the load to the chest and at the same time to rapidly restrain the rear half portion of the chest (the portion on the back side) that has relatively high load resistance.

In this point, in the fourth aspect of the present invention, when the side airbag is inflated and deployed, the inflation width enlarging section provided in the side airbag restricts the position of the front-rear partition section in the vehicle fore-and-aft direction and enlarges the inflation width of the rear bag portion in the vehicle width direction. Accordingly, if the front-rear partition section is set to face the central portion in the fore-and-aft direction on the side surface of the chest of the occupant, the rear portion whose inflation width in the vehicle width direction is enlarged can rapidly contact with the rear half portion of the chest. This allows an improvement in the initial occupant restraining performance of the side airbag.

As described above, the side airbag devices for a vehicle in accordance with the first to fourth aspects can improve the initial occupant restraining performance of the side airbag in which the front bag portion and the rear bag portion are partitioned from each other by the front-rear partition section.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Embodiment

Figure 1:
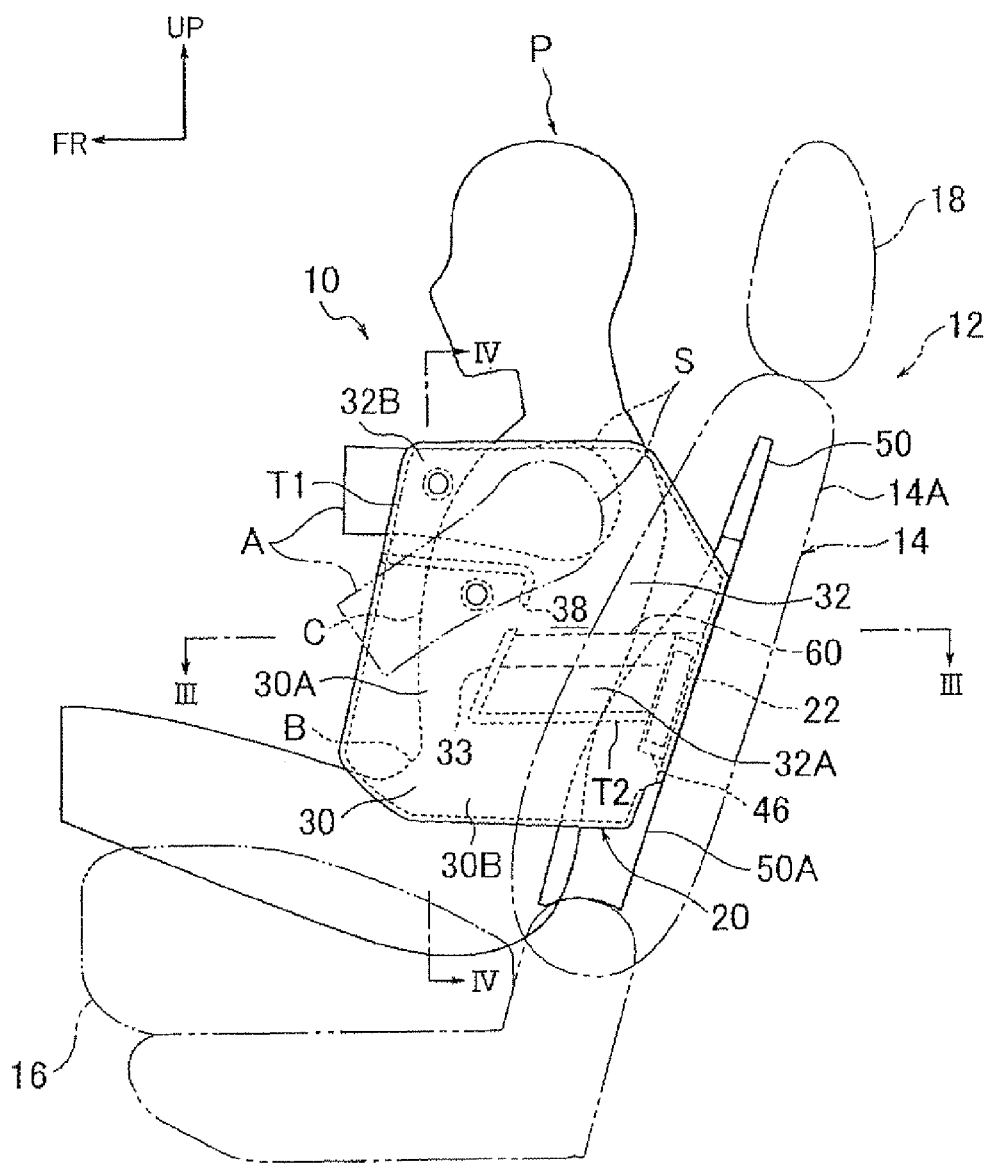
FIG. 1 is a side view of a vehicle seat in which a side airbag device for a vehicle in accordance with a first embodiment of the present invention is installed, which shows a state where a side airbag included in the side airbag device is inflated and deployed.

A side airbag device 10 for a vehicle in accordance with a first embodiment of the present invention will be described with reference to FIGS. 1 to 4. It should be noted that arrows FR, UP, and OUT appropriately indicated in the drawings denote a front direction (traveling direction), an up direction, and an outward direction in the vehicle width direction, respectively. Hereinafter, simply front, rear, up, and down directions used in descriptions denote front and rear in the vehicle fore-and-aft direction and up and down direction in the vehicle vertical direction, unless otherwise specified.

(Configuration)

As shown in FIG. 1, the side airbag device 10 in accordance with this embodiment is installed in a door side portion 14A (an outside portion in the vehicle width direction) of a seat back 14 in a vehicle seat 12. The seat back 14 is coupled to a rear end portion of a seat cushion 16 in an inclinable manner and has a head rest 18 coupled to an upper end portion.

In this embodiment, front, up, and width directions of the vehicle seat 12 correspond to front, up, and width directions of the vehicle. In FIG. 1, an occupant P seated on the vehicle seat 12 is a World Side Impact Dummy (World SID), for example.

The side airbag device 10 is configured with a side airbag 20, an inflator 22 as a gas generating device for generating gas in the side airbag 20, a diffuser 46 for straightening the flow of the gas generated from the inflator 22, a strap (tether) 60 as an extending member provided in the side airbag as main components. Each of the components will be described hereinafter.

The side airbag 20 is disposed inside the door side portion 14A in a state where the side airbag 20 is folded and unitized (modularized) together with the inflator 22, the diffuser 46, and the strap 60. FIG. 1 shows a state where the side airbag 20 is inflated and deployed toward a vehicle front from the door side portion 14A by the pressure of the gas generated by the inflator 22 (deployment complete state). Further, a seat back pad covered by seat upholstery (neither shown) is arranged in a periphery of the side airbag device 10. A seamed joint of the seat upholstery and the seat back pad are configured to split when the side airbag 20 is inflated and deployed.

Figure 2:
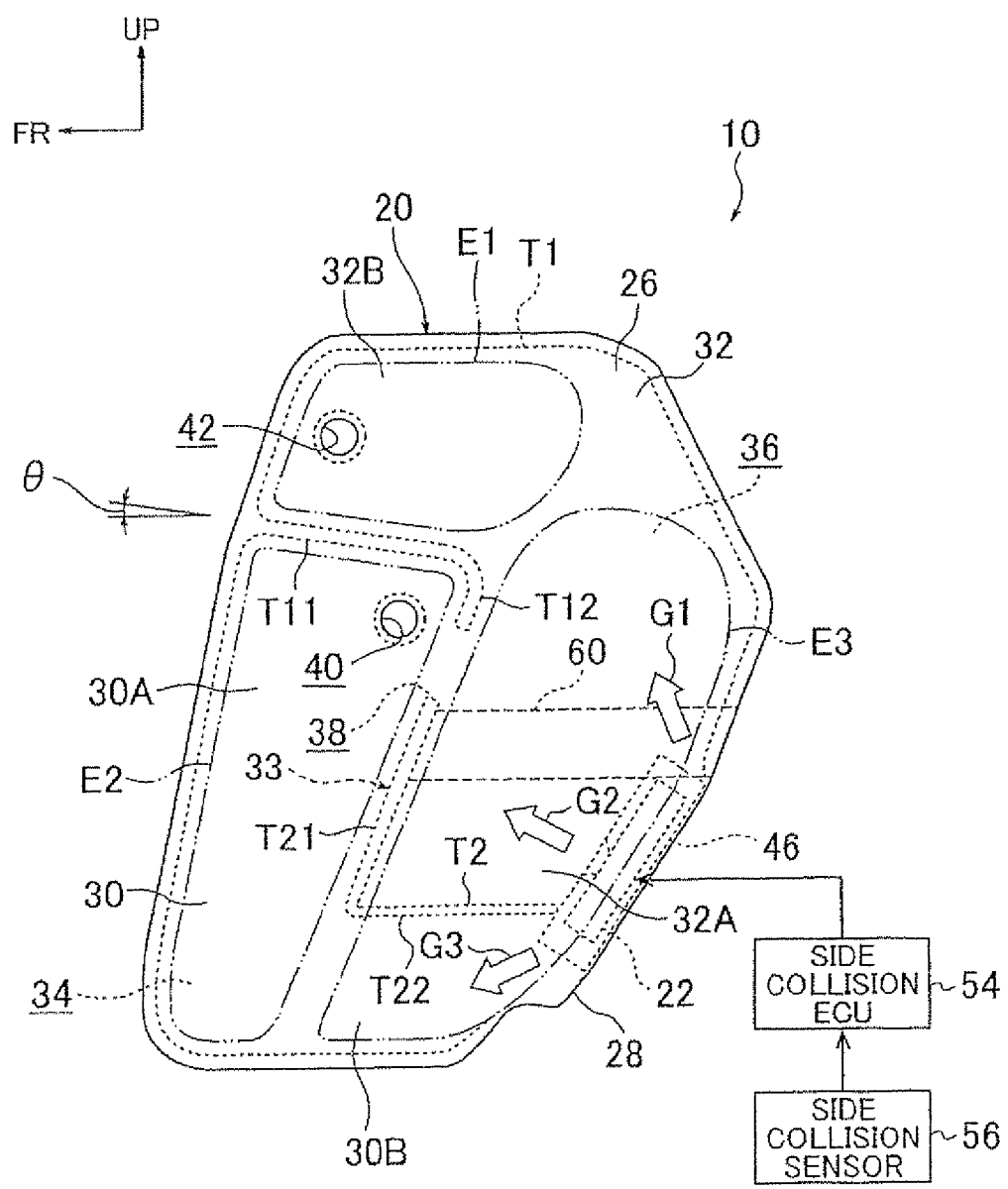
FIG. 2 is an enlarged cross-sectional view showing the side airbag of FIG. 1 on larger scale.
Figure 3:
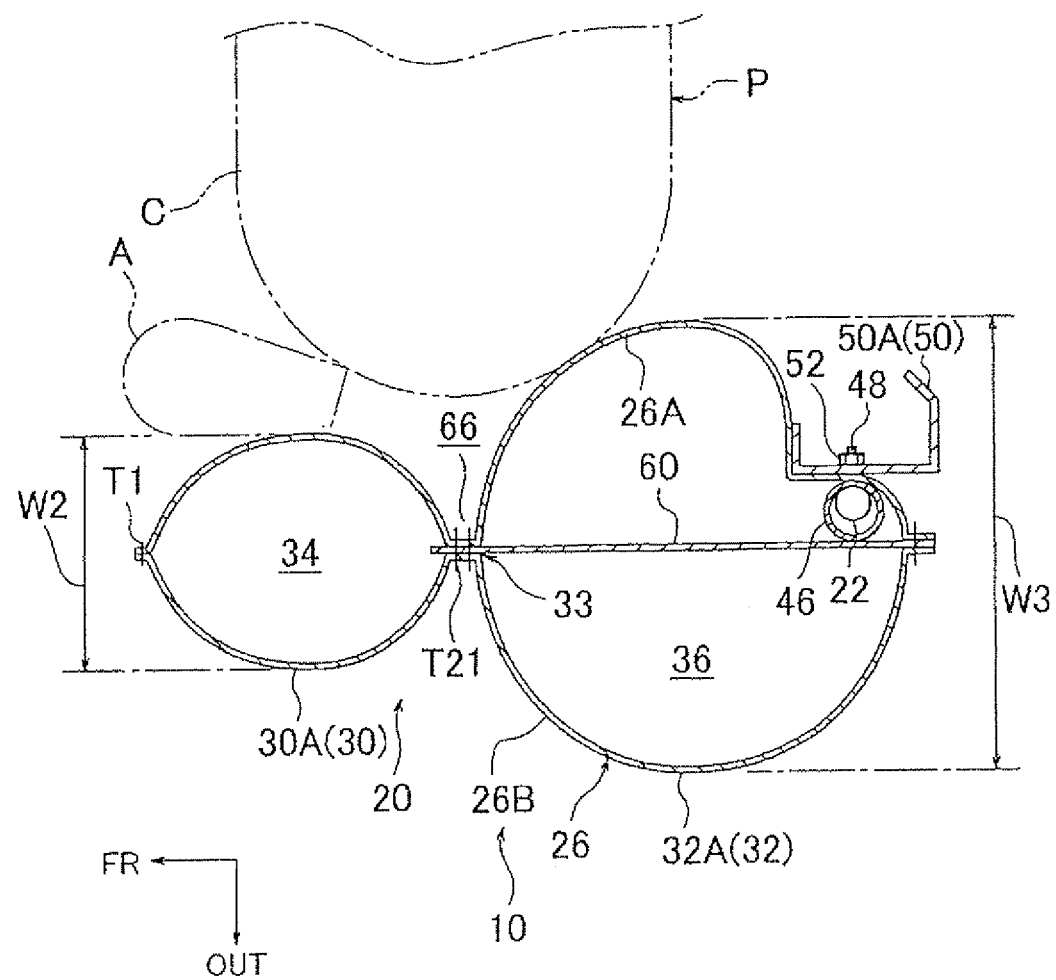
FIG. 3 is an enlarged cross-sectional view taken along line III-III of FIG. 1.
Figure 4:
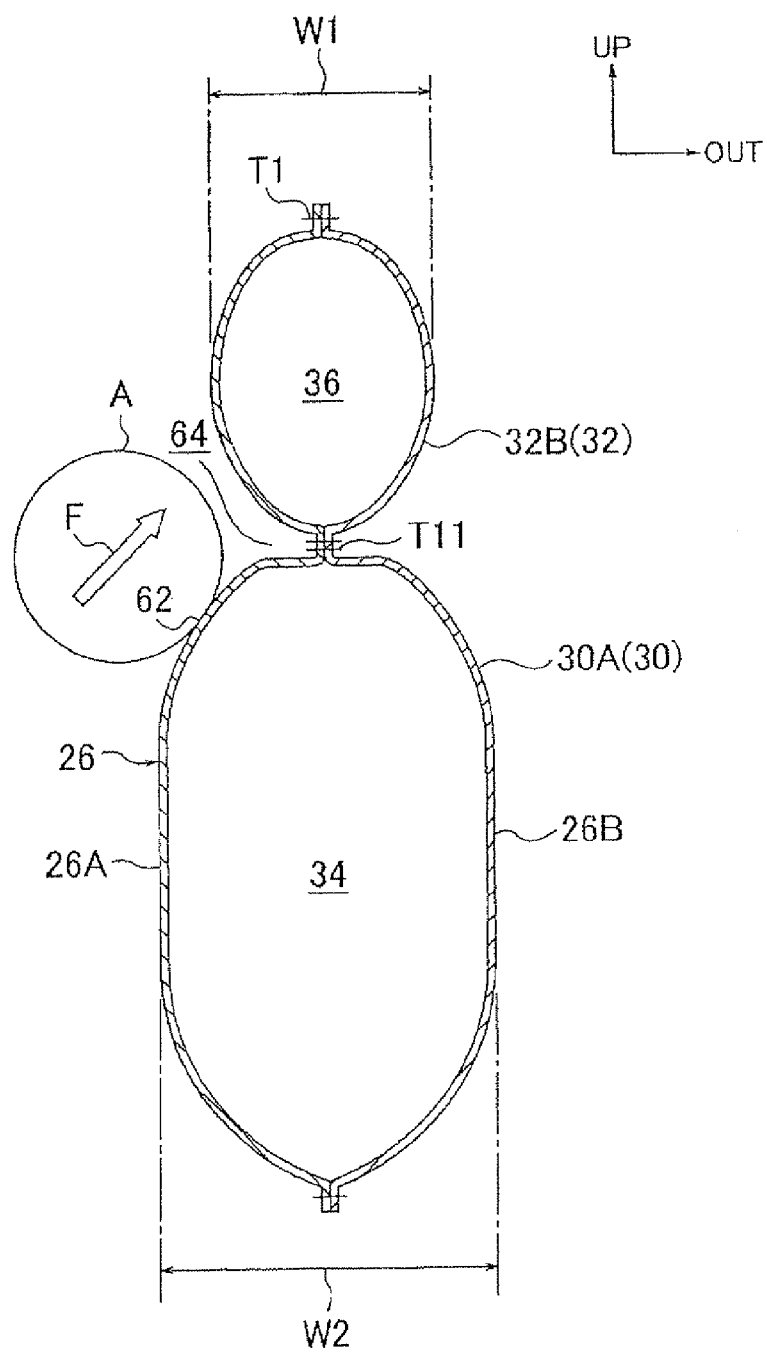
FIG. 4 is an enlarged cross-sectional view taken along line IV-IV of FIG. 1.

As shown in FIGS. 2 to 4, the side airbag 20 is a "two-chamber 2D side airbag". The side airbag 20 is configured with a single piece of base cloth 26 formed by cutting out a nylon-based or polyester-based cloth material, for example. The side airbag 20 is formed into a bag shape by folding and piling the base cloth 26 along a fold line 28 and sewing a peripheral portion in a seam T1. The side airbag 20 is disposed such that the fold line 28 of the base cloth 26 is positioned in a rear end portion, one side portion 26A via the fold line 28 faces the inside in the vehicle width direction (seated occupant side), and the other side portion 26B via the fold line 28 faces the outside in the vehicle width direction (side door side which is not shown) in an inflated and deployed state. The present invention is not limited to the configuration in which the side airbag 20 is sewn from the single piece of base cloth 26. However, the side airbag 20 may be formed into a bag shape by piling two pieces of base cloth and sewing peripheral portions thereof. The fore-and-aft and up and down directions of the side airbag 20 described below are the directions in the inflated and deployed state of the side airbag 20 and substantially correspond to the fore-and-aft and up and down directions of the vehicle.

The above-described seam T1 includes an upper lateral extension portion T11 that extends from an upper side of a front edge portion of the side airbag 20 toward a rear end of the side airbag 20 and reaches a portion adjacent to an intermediate portion of the side airbag 20 in the fore-and-aft direction and an upper lengthwise extension portion T12 that extends from a rear end of the upper lateral extension portion T11 toward a lower end of the side airbag 20 and reaches a portion adjacent to a central portion of the side airbag 20. The base cloth 26 is also sewn in the upper lateral extension portion T11 and the upper lengthwise extension portion T12. Further, the base cloth 26 is also sewn in a seam T2. The seam T2 is configured with a lower lengthwise extension portion T21 that extends from a portion adjacent to a lower end of the upper lengthwise extension portion T12 toward the lower end of the side airbag 20 and reaches a lower portion of the side airbag 20 and a lower lateral extension portion T22 that extends from a lower end of the lower lengthwise extension portion T21 toward the rear end of the side airbag 20 and reaches a portion adjacent to a rear edge of the side airbag 20. The base cloth 26 is sewn in the upper lateral extension portion T11, the upper lengthwise extension portion T12, the lower lengthwise extension portion T21, and the lower lateral extension portion T22, thereby defining (dividing) the side airbag 20 into a front bag portion 30 that has an L-shape in a side view and a rear bag portion 32 that has a general inverted L-shape in a side view.

The front bag portion 30 is configured with a front main body 30A that extends in a up and down direction of the side airbag 20 on a front side of the side airbag 20 and a rear extension portion 30B that extends from a lower end side of the front main body 30A toward a rear side of the side airbag 20. The rear bag portion 32 is configured with a rear main body 32A that extends in the up and down direction of the side airbag 20 on a rear side of the side airbag 20 and a front extension portion 32B that extends from an upper end side of the rear main body 32A toward the front side of the side airbag 20. The front main body 30A and the rear main body 32A are defined by a front-rear partition section 33 configured with the upper lengthwise extension portion T12 and the lower lengthwise extension portion T21. Further, the front extension portion 32B is arranged above the front main body 30A, and the rear extension portion 30B is arranged below the rear main body 32A.

An inside of the front bag portion 30 serves as a front chamber 34, and an inside of the rear bag portion 32 serves as a rear chamber 36. In other words, an inside of the side airbag 20 is defined into the front chamber 34 and the rear chamber 36. However, a portion between the lower end of the upper lengthwise extension portion T12 and an upper end of the lower lengthwise extension portion T21 is not sewn, thereby forming a front-rear communication opening (gas inlet) 38. The front chamber 34 and the rear chamber 36 communicate with each other via the front-rear communication opening 38. Further, the front chamber 34 communicates with the outside of the side airbag 20 via a vent hole 40 formed on an upper end side of the front main body 30A. The rear chamber 36 communicates with the outside of the side airbag 20 via a vent hole 42 formed on a front end side of the front extension portion 32B.

Meanwhile, the inflator 22 is a cylinder-type inflator and is housed on a lower side of a rear end portion of the rear main body 32A together with the cylindrically formed diffuser 46. The inflator 22 is coaxially housed inside the diffuser 46 and is fixed to the diffuser 46 by caulking a portion of the diffuser 46. As shown in FIG. 1, the inflator 22 and the diffuser 46 are arranged such that their axial directions are aligned along the height direction of the seat back 14.

A pair of upper and lower stud bolts 48 (see FIG. 3) protrude inward in the vehicle width direction from an outer peripheral portion of the diffuser 46. The stud bolts 48 pass through the side airbag 20 and a side frame 50A of the seat back frame 50 and have nuts 52 screwed on tips thereof. Accordingly, the diffuser 46 together with the side airbag 20 is fastened and fixed to the side frame 50A. A lower end of the diffuser 46 is inserted in a gap formed between a rear end of the lower lateral extension portion T22 and the rear edge of the side airbag 20 and protrudes inside the rear extension portion 30B (front chamber 34).

As shown in FIG. 2, the above-described inflator 22 is electrically connected with a side collision ECU 54 installed in the vehicle. The side collision ECU 54 is electrically connected with a side collision sensor 56 for detecting a side collision. The side collision ECU 54 is configured to actuate the inflator 22 when a side collision (or unavoidability of a collision) is detected on the basis of a signal from the side collision sensor 56. In a case where the side collision ECU 54 is electrically connected with a pre-crash sensor that predicts a side collision, the side collision ECU 54 may be configured such that the inflator 22 is actuated when the side collision ECU 54 predicts a side collision on the basis of the signal from the pre-crash sensor.

Meanwhile, the strap 60 constitutes an inflation width enlarging section and is provided in the rear main body 32A in the rear bag portion 32 of the side airbag 20. The strap 60 is formed with a cloth material same as the base cloth 26 into a long belt shape. A front end portion of the strap 60 is sewn to a front end portion (the front-rear partition section 33) of the rear main body 32A in the lower lengthwise extension portion T21 of the seam T2. A rear end portion of the strap 60 is sewn to the rear end portion of the rear main body 32A in the seam T1. In other words, the strap 60 is stretched between both the front and rear end portions of the rear main body 32A and is disposed to be positioned in a central portion of the rear main body 32A in the up and down direction with the longitudinal direction of the strap 60 aligned along the fore-and-aft direction in the inflated and deployed state of the side airbag 20.

In the side airbag device 10 in the above configuration, when the inflator 22 is actuated, gas blows out from a gas outlet provided on an upper end side or a lower end side of the inflator 22. The gas that blows out from the gas outlet is supplied to the rear chamber 36 through an upper end opening of the diffuser 46 and an opening (not shown) that is formed in an intermediate portion of the diffuser 46 in the up and down direction (see arrows G1, G2 in FIG. 2). A portion of the gas supplied to the rear chamber 36 is supplied to the front chamber 34 via the front-rear communication opening 38. Further, the gas that blows out from the gas outlet of the inflator 22 is directly supplied to the front chamber 34 through a lower end opening of the diffuser 46 (see arrow G3 in FIG. 2). Accordingly, the side airbag 20 is inflated and deployed between the occupant P and a vehicle side portion (here, a door trim of a side door which is not shown).

As shown in FIG. 1, in the state where the side airbag 20 is inflated and deployed, the front bag portion 30 and the rear bag portion 32 are aligned in the fore-and-aft direction and the up and down direction. In this state, the front main body 30A of the front bag portion 30 is inflated and deployed on a lateral side of a front half portion of a chest C of the occupant P, and a rear end of an upper edge (the upper lateral extension portion T11) of the front main body 30A is arranged on a lateral side of a side of the occupant P. Further, the rear extension portion 30B of the front bag portion 30 is inflated and deployed on a lateral side of an abdomen B of the occupant P. Meanwhile, the rear main body 32A of the rear bag portion 32 is inflated and deployed on a lateral side of a rear half portion of the chest C of the occupant P above the rear extension portion 30B, and the front extension portion 32B extends from a lateral side of a shoulder S of the occupant P toward the vehicle front and is arranged above the front main body 30A. The side airbag 20 in the inflated and deployed state will be described hereinafter in detail.

In the side airbag 20, a dimension W2 (see FIG. 3) in the vehicle width direction of a portion in front of and below the front extension portion 32B (see an area denoted by a reference symbol E2 in FIG. 2) is set shorter than a dimension W3 (see FIG. 3) in the vehicle width direction of a portion in the rear of and below the front extension portion 32B (see an area denoted by a reference symbol E3 in FIG. 2). Further, in the side airbag 20, a dimension W1 (see FIG. 4) of the front extension portion 32B in the vehicle width direction (see an area denoted by a reference symbol E1 in FIG. 2) is set shorter than the dimension W2 of the front main body 30A in the vehicle width direction. In other words, the dimensions (inflation width) of the side airbag 20 in the vehicle width direction in the inflated and deployed state is set to a relationship of W3>W2>W1.

As described above, the dimension W1 of the front extension portion 32B in the vehicle width direction is set shorter than the dimension W2 of the front main body 30A (the front bag portion 30) in the vehicle width direction. Accordingly, as shown in FIG. 4, an inside surface in the vehicle width direction on the upper end side of the front main body 30A serves as an upper arm push-up surface 62 that is curved upward toward the outside in the vehicle width direction. The upper arm push-up surface 62 may be configured to incline upward toward the outside in the vehicle width direction. In addition, the front extension portion 32B and the front bag portion 30 are defined by the upper lateral extension portion T11 of the seam T1. Accordingly, a push-up space 64 for pushing up an upper arm A is formed inside of the upper lateral extension portion T11 in the vehicle width direction.

Further, the side airbag 20 is formed such that the upper lateral extension portion T11 that is the upper end of the front main body 30A (an upper end of the front bag portion 30), as shown in FIG. 2, inclines upward toward the front with respect to the vehicle fore-and-aft direction when the side airbag 20 is inflated and deployed in a state where the seat back 14 is in a reference set position. A reference symbol θ in FIG. 2 indicates an inclination angle of the upper lateral extension portion T11 with respect to the vehicle fore-and-aft direction. The upper lateral extension portion T11 is set as described above, and the front extension portion 32B is thereby formed such that its dimension in the up and down direction decreases toward the front end. In other words, the front extension portion 32B is inflated and deployed in a general circular truncated cone shape whose axial line inclines upward toward the front with respect to the vehicle fore-and-aft direction.

Further, in the side airbag 20, when the rear bag portion 32 is inflated and deployed, the strap 60 whose front end is sewn to (locked on) the front end portion (the front-rear partition section 33) of the rear main body 32A and whose rear end is sewn to (locked on) the rear end of the rear main body 32A is extended in the vehicle fore-and-aft direction. As a result, the position of the front-rear partition section 33 in the vehicle fore-and-aft direction is restricted. In other words, the longitudinal dimension of the strap 60 is set shorter than the inflation width of the rear main body 32A in the vehicle fore-and-aft direction in a case where no strap 60 is provided. Accordingly, in this embodiment in which the strap 60 is stretched between both the front and rear end portions of the rear main body 32A, the strap 60 is extended, and inflation of the rear main body 32A in the vehicle fore-and-aft direction is thereby restricted while the inflation width W3 of the rear main body 32A in the vehicle width direction is enlarged (increased).

Further, the position of the front-rear partition section 33 in the vehicle fore-and-aft direction is restricted as described above, and the front-rear partition section 33 is thereby configured to face a central portion of the chest C of the occupant P in the fore-and-aft direction (a central portion in the fore-and-aft direction or a portion adjacent to the central portion in the fore-and-aft direction, that is, a portion protruding to an outermost position in the vehicle width direction). Accordingly, the front bag portion 30 is arranged on the lateral side of the front half portion of the chest C and the abdomen B of the occupant P, and the rear bag portion 32 is arranged on the lateral side of the rear half portion of the chest C and the abdomen B of the occupant P.

Further, as shown in FIG. 3, an inside surface of the side airbag 20 in the vehicle width direction is recessed outward in the vehicle width direction to form a recess 66 in a portion adjacent to the front-rear partition section 33. The recess 66 faces the central portion of the chest C in the fore-and-aft direction.

In the side airbag device 10, the gas blows out from the inflator 22 is supplied (distributed) to the front chamber 34 and the rear chamber 36 by the diffuser 46. Along with that, a portion of the gas supplied to the front chamber 34 is discharged through the vent hole 40, and a portion of the gas supplied to the rear chamber 36 is discharged through the vent hole 42. Accordingly, the inner pressure of the rear chamber 36 in the inflated and deployed state is higher than the inner pressure of the front chamber 34.

(Operation and Effect)

Operation and effect of this embodiment will next be described.

In the side airbag device 10 in the above configuration, when the side collision ECU 54 detects a side collision by a signal from the side collision sensor 56, the inflator 22 is actuated by the side collision ECU 54. Then, the gas blowing out from the gas outlet of the inflator 22 is supplied to the front chamber 34 and the rear chamber 36 of the side airbag 20, and the side airbag 20 is inflated and deployed between the occupant P and the door trim of the side door. In the inflated and deployed state, the front bag portion 30 is arranged on the vehicle front side of the rear bag portion 32. Accordingly, the occupant P seated on the vehicle seat 12 can be restrained from the outside in the vehicle width direction by the front bag portion 30 and the rear bag portion 32.

Here, in order to improve initial occupant restraining performance of the side airbag 20, it is effective to allow the front-rear partition section 33 set between the front main body 30A of the front bag portion 30 and the rear main body 32A of the rear bag portion 32 to face the central portion in the fore-and-aft direction (the portion protruding to the outermost position in the vehicle width direction) of a side surface of the chest C and thereby to reduce the load to the chest C and at the same time to rapidly restrain the rear half portion of the chest C (a portion on the back side) that has relatively high load resistance.

In this point, in this embodiment, when the side airbag 20 is inflated and deployed, the strap 60 provided in the rear main body 32A is extended and restricts inflation of the rear main body 32A in the vehicle fore-and-aft direction. Accordingly, the front-rear partition section 33 faces the central portion in the fore-and-aft direction on the side surface of the chest C of the occupant P, and the inflation width W3 of the rear main body 32A in the vehicle width direction is enlarged. This results in a reduced load to the chest C and the rapid contact of the rear main body 32A with the rear half portion of the chest C, thus allowing an improvement in the initial occupant restraining performance of the side airbag 20.

In other words, the rear half portion of the chest C that has relatively high load resistance is rapidly restrained by the rear main body 32A, and a load input from the front main body 30A to the front half portion of the chest C that has relatively low load resistance can thereby be reduced. As described above, the body (upper body) of the occupant P is appropriately restrained according to the magnitude of load resistance, thereby allowing an improvement in the initial occupant restraining performance of the side airbag 20. In addition, this can be achieved by such a small change as setting the strap 60 in the rear main body 32A and thus achieved in a simple configuration.

Further, in this embodiment, when the side airbag 20 is inflated and deployed, the front extension portion 32B provided in an upper portion of the rear bag portion 32 extends from the lateral side of the shoulder S of the occupant P toward the vehicle front and is arranged above the front bag portion 30. The dimension (inflation width) of the front extension portion 32B in the vehicle width direction is set shorter than that of the front bag portion 30. Accordingly, an inside surface in the vehicle width direction on the upper end side of the front bag portion 30 (the upper end side of the front main body 30A) serves as the upper arm push-up surface 62 (see FIG. 4) that is curved upward toward the outside in the vehicle width direction.

Accordingly, the side airbag 20 relatively approaches the occupant P due to an impact of a side collision, the upper arm push-up surface 62 comes into sliding contact with the upper arm A of the occupant P, and force F that pushes up the upper arm A (see FIG. 4) is thereby generated. As a result, the upper arm A is pushed up above the front main body 30A and is restrained by the front extension portion 32B arranged above the front main body 30A (see the upper arm A indicated by a solid line and a broken line in FIG. 1). Accordingly, the upper arm A is hindered from being interposed between the chest C of the occupant P and the side airbag 20, and an application of a load from the upper arm A to the chest C can thus be hindered.

Further, in this embodiment, the front extension portion 32B and the front main body 30A of the front bag portion 30 are defined by the seam T11, and a push-up space 64 for pushing up the upper arm A is formed inside of the seam T11 in the vehicle width direction. Accordingly, the upper arm A pushed up by the slide contact with the upper arm push-up surface 62 can be inhibited from unnecessarily interfering with the front extension portion 32B. As a result, the upper arm A can smoothly be pushed up.

Moreover, in this embodiment, the above-described front extension portion 32B extends from the lateral side of the shoulder S of the occupant P toward the vehicle front and is arranged above the front main body 30A (front bag portion 30). Accordingly, for example, even when the side collision occurs in an oblique side collision manner and the occupant P makes inertia movement obliquely toward the vehicle front, the shoulder S of the occupant P can be kept by the front extension portion 32B. This enables proper restraint of the shoulder S of the occupant P by the side airbag 20 regardless of the manner of side collision and enables sustainment of restraint of the shoulder S to a latter phase of collision.

Further, in this embodiment, the chest C of the occupant P can be restrained from the front and the rear by the front bag portion 30 and the rear bag portion 32, and the side surface of the chest C can be restrained such that the side surface is covered along its curve. This allows stabilization of the positional relationship between the chest C and the side airbag 20 in the vehicle fore-and-aft direction.

Moreover, in this embodiment, the front-rear partition section 33 (the seams T12, T21) is set on the boundary between the front bag portion 30 and the rear bag portion 32 in the vehicle fore-and-aft direction. Therefore, the recess 66 that is recessed outward in the vehicle width direction is formed in the inside surface of the side airbag 20 in the vehicle width direction in a portion adjacent to the boundary. Accordingly, the recess 66 contacts with the central portion (in other words, the portion protruding to the outermost position in the vehicle width direction) on the side surface of the chest C, thereby allowing effective reduction in a load to the chest C (ribs or the like).

Further, in this embodiment, in the state where the side airbag 20 is inflated and deployed, the inner pressure of the rear bag portion 32 that restrains the rear side of the chest C, the shoulder S, and the upper arm A that have relatively high load resistance is higher than the inner pressure of the front bag portion 30 that restrains the front side of the chest C and the abdomen B that have relatively low load resistance. Accordingly, also in this point, the load to parts in the body of the occupant P that have relatively low load resistance can be reduced, and parts that have relatively high load resistance can effectively be restrained at the same time.

Moreover, in this embodiment, the dimension (inflation width) of the side airbag 20 in the vehicle width direction in the inflated and deployed state is set to the relationship of "the rear side below the front extension portion 32B> the front side below the front extension portion 32B> the front extension portion 32B, that is, W3>W2>W1". Accordingly, restraint of the body of the occupant P according to the magnitude of load resistance can be controlled by setting of the inflation width in addition to setting of the inner pressure of the side airbag 20. As a result, the strength and speed of the restraint by the side airbag 20 can more appropriately be controlled. This also can facilitate an action for pushing up the upper arm A.

In addition, in this embodiment, the front extension portion 32B of the rear bag portion 32 is formed such that its dimension in the up and down direction decreases toward the front end. In other words, because the up and down width of the front extension portion 32B becomes narrow on the front end side, the deployment performance of the front extension portion 32B into a narrow gap between the shoulder S of the occupant P and the door trim of the side door can be improved.

Further, in this embodiment, in a state where the seat back 14 is in the reference set position and the side airbag 20 is inflated and deployed, the upper end of the front bag portion 30 (the upper lateral extension portion T11) inclines upward toward the front with respect to the vehicle fore-and-aft direction. Accordingly, the point of action of the push-up force F which acts on the upper arm A of the occupant P due to the sliding contact with the inside surface in the vehicle width direction (the upper arm push-up surface 62) on the upper end side of the front main body 30A can be set to the vehicle front side. As a result, because the moment in the push-up direction that acts on the upper arm A can be increased, the upper arm A can further properly be pushed up.

In addition, the front extension portion 32B is inflated and deployed in a general circular truncated cone shape that is tapered toward the front end of the side airbag 20, and the axial line of the front extension portion 32B inclines upward toward the front with respect to the vehicle fore-and-aft direction. Accordingly, a curved surface on an upper side of the inside surface of the front extension portion 32B in the vehicle width direction inclines upward toward the front. Therefore, in a case where the occupant P makes inertia movement obliquely toward the vehicle front due to an impact of an oblique side collision, the shoulder S of the occupant P comes into sliding contact with the curved surface of the front extension portion 32B, and the shoulder S is thereby pushed up. This allows facilitation of pushing up of the upper arm A.

Moreover, in this embodiment, the vent holes 40, 42 for discharging the gas supplied to the inside the front bag portion 30 and the rear bag portion 32 to the outside are respectively formed therein. Therefore, the sizes of the vent holes 40, 42 are individually changed, and the inner pressure of the bag portions 30, 32 can independently and easily be adjusted.

(Supplementary descriptions of first embodiment) In the configuration of the first embodiment, the vent holes 40, 42 are formed in the side airbag 20. The present invention is not limited thereto, but either one or both of the vent holes 40, 42 may be omitted.

Further, in the configuration of the first embodiment, in the state where the seat back 14 is in the reference set position and the side airbag 20 is inflated and deployed, the upper end of the front bag portion 30 (the upper lateral extension portion T11) inclines upward toward the front with respect to the vehicle fore-and-aft direction. However, the present invention is not limited thereto. For example, the upper end of the front bag portion 30 may be arranged along the vehicle fore-and-aft direction.

Further, in the configuration of the first embodiment, the dimension of the front extension portion 32B in the up and down direction decreases toward the front end in the inflated and deployed state. However, the present invention is not limited thereto. The front extension portion 32B may have a constant dimension in the up and down direction.

In addition, in the configuration of the first embodiment, the inner pressure of the rear bag portion 32 is higher than that of the front bag portion 30. The present invention is not limited thereto, but the inner pressure may be the same in the bag portions 30, 32. Further, the inner pressure of the front bag portion 30 may be higher than that of the rear bag portion 32. In such a case, the effect of pushing up the upper arm A by the front bag portion 30 can be enhanced.

Further, in the configuration of the first embodiment, the front bag portion 30 includes the rear extension portion 30B that extends downward of the rear bag portion 32. The present invention is not limited thereto, but the rear extension portion 30B may be omitted, and the rear main body 32A may extend downward.

Further, in the configuration of the first embodiment, the strap 60 is formed of the cloth material same as the base cloth 26. The present invention is not limited thereto, but the material of the strap 60 can appropriately be changed.

The above supplementary descriptions are likewise applied to other embodiments of the present invention that are described below. In the embodiments described below, components and operations basically the same as the first embodiment will be given like reference numerals and symbols of the first embodiment, and descriptions thereof will not be made.

Second Embodiment

Figure 5:
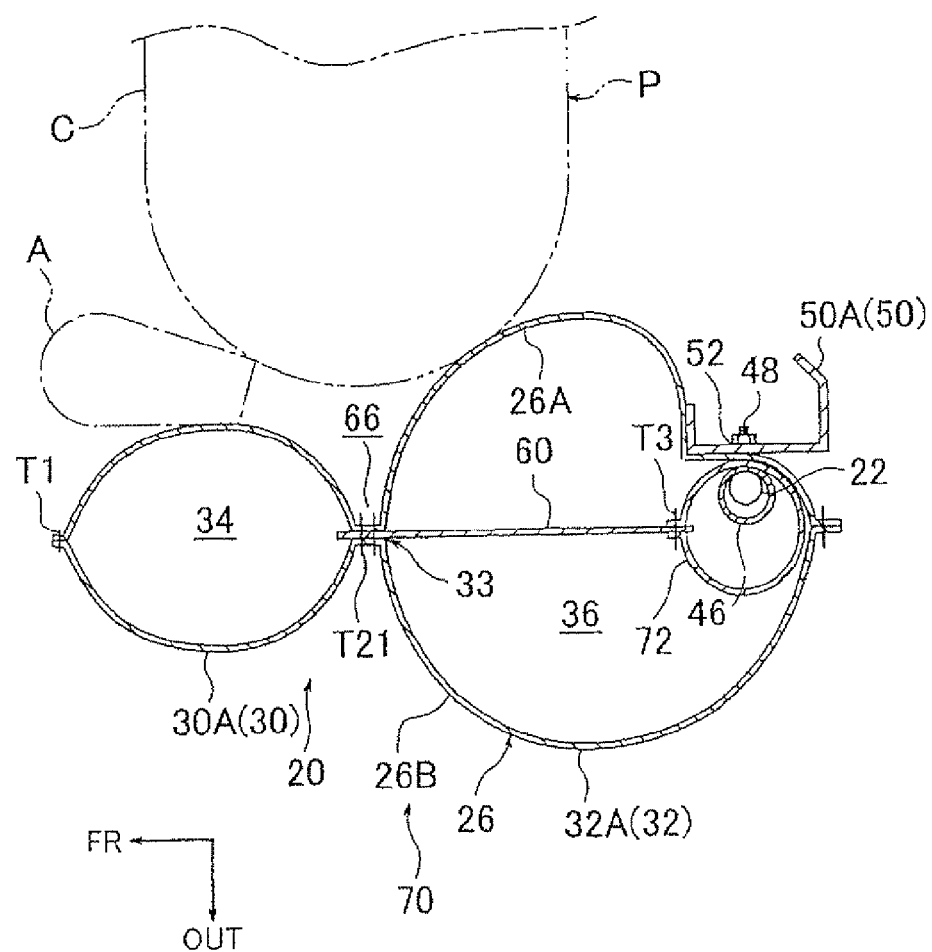
FIG. 5 is a cross-sectional view corresponding to FIG. 3 and showing a partial configuration of a side airbag device for a vehicle in accordance with a second embodiment of the present invention.

FIG. 5 shows a partial configuration of a side airbag device 70 for a vehicle in accordance with a second embodiment of the present invention by a cross-sectional view corresponding to FIG. 3. This embodiment is different from the first embodiment in that a rear end portion of a strap 60' is sewn to (locked on) a straightening cloth (inner tube) 72. The straightening cloth 72 distributes the gas blowing out from upper and lower openings of the diffuser 46 in the up and down direction. The straightening cloth 72 is formed into a cylindrical shape by sewing one end and the other end of a piece of rectangular cloth formed of a cloth material same as the base cloth 26 in the seam T3. The straightening cloth 72 is arranged on a rear end side in the rear main body 32A in a state where the axial direction of the straightening cloth 72 is aligned along the height direction of the seat back 14. The inflator 22 and the diffuser 46 are housed inside the straightening cloth 72, and a portion of the straightening cloth 72 is interposed between the diffuser 46 and the base cloth 26. The rear end portion of the strap 60' is sewn together to a seam T3 of the straightening cloth 72. The strap 60' has a basically same configuration as the strap 60 in accordance with the first embodiment but is formed slightly shorter than the strap 60.

In this embodiment, when the rear bag portion 32 is inflated and deployed, the strap 60' is extended between the straightening cloth 72 and a front end portion (the front-rear partition section 33) of the rear bag portion 32, thereby restricting the inflation of the rear main body 32A in the vehicle fore-and-aft direction. Accordingly, the inflation width of the rear main body 32A in the vehicle width direction is enlarged. Therefore, this first modification can provide basically the same operation and effect as the first embodiment.

Third Embodiment

Figure 6:
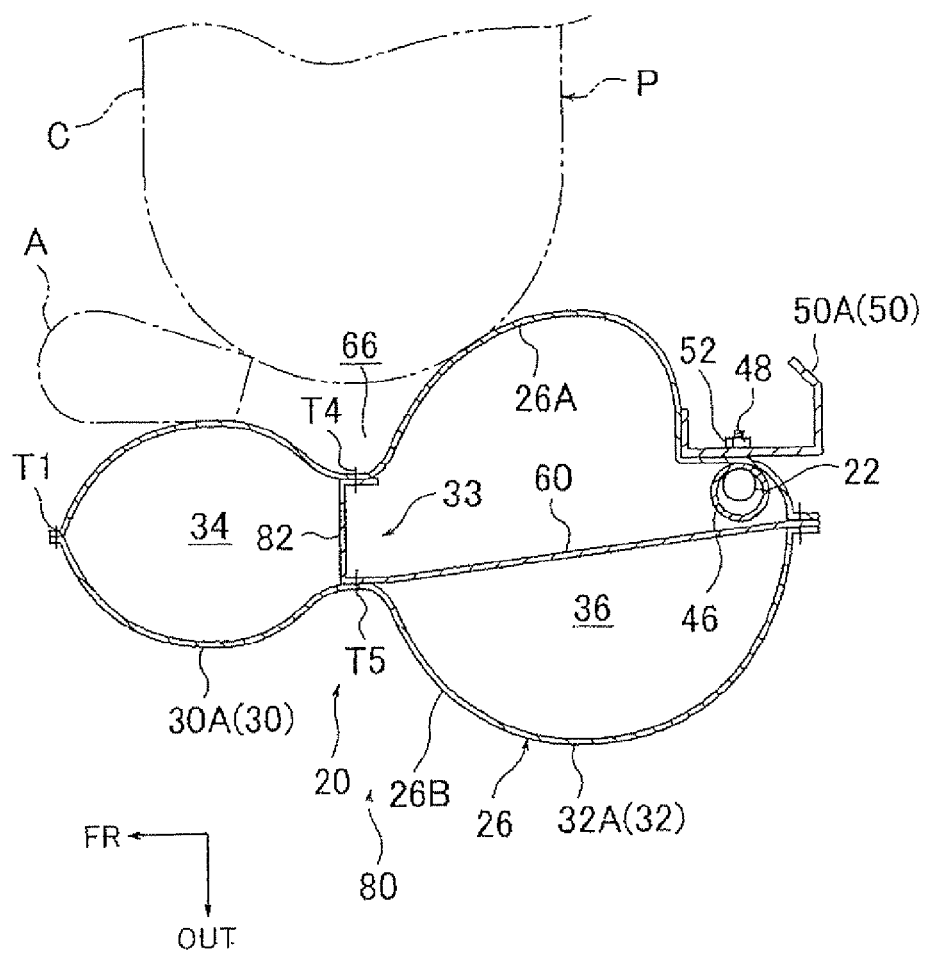
FIG. 6 is a cross-sectional view corresponding to FIG. 3 and showing a partial configuration of a side airbag device for a vehicle in accordance with a third embodiment of the present invention.

FIG. 6 shows a partial configuration of a side airbag device 80 for a vehicle in accordance with a third embodiment of the present invention by a cross-sectional view corresponding to FIG. 3. This embodiment is different from the first embodiment in that the front-rear partition section 33 is configured with a tether 82. The tether 82 is formed with a cloth material same as the base cloth 26 into a long belt shape. One long side edge portion is sewn to one side portion 26A of the base cloth 26 in a seam T4, and the other long side edge portion is sewn to the other side portion 26B of the base cloth 26 in a seam T5. The tether 82 defines the front main body 30A and the rear main body 32A.

Further, in this embodiment, the strap 60 and the tether 82 are integrally formed of a single piece of cloth material. A front end portion of the strap 60 is integrally connected to the other long side edge portion of the tether 82. This embodiment provides basically the same operation and effect as the first embodiment. In addition, the inflation widths of the front main body 30A and the rear main body 32A can be increased, and an impact absorbing stroke can properly be obtained. The front end portion of the strap 60 may be integrally connected to the one long side edge portion of the tether 82.

Fourth Embodiment

Figure 7:
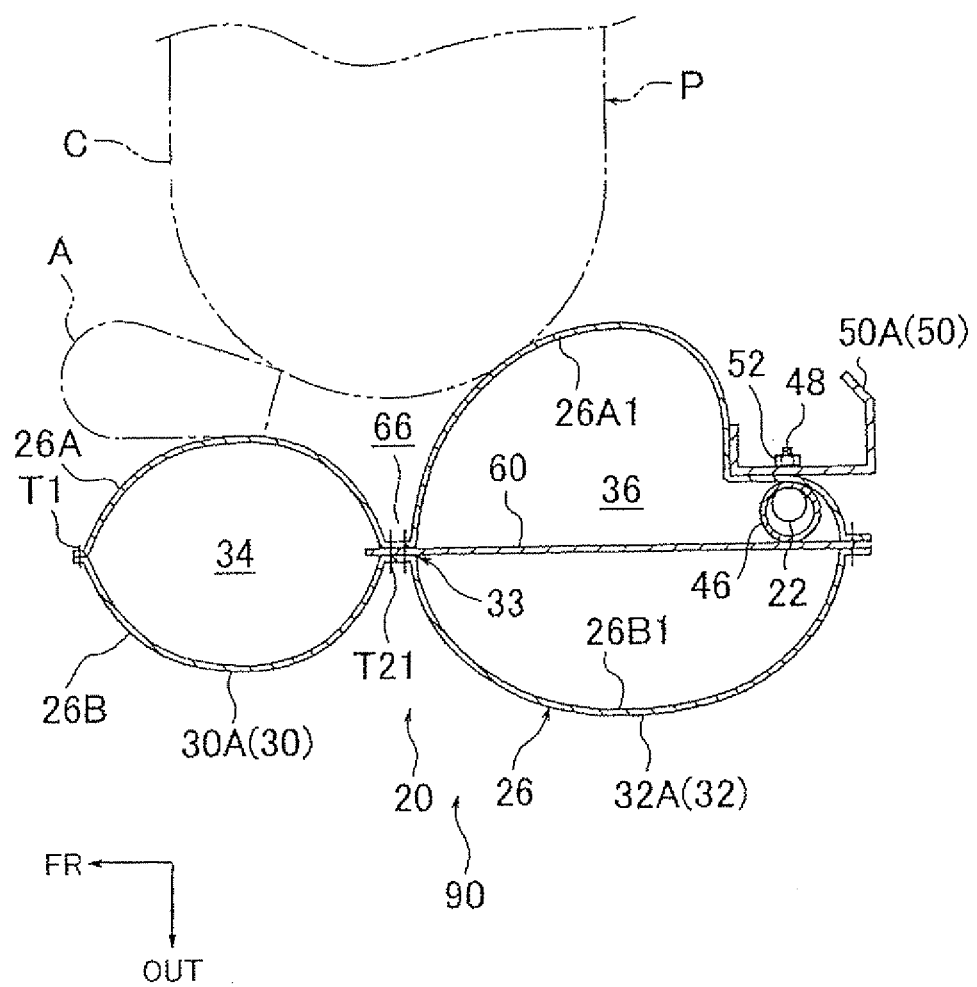
FIG. 7 is a cross-sectional view corresponding to FIG. 3 and showing a partial configuration of a side airbag device for a vehicle in accordance with a fourth embodiment of the present invention.

FIG. 7 shows a partial configuration of a side airbag device 90 for a vehicle in accordance with a fourth embodiment of the present invention by a cross-sectional view corresponding to FIG. 3. This embodiment is different from the first embodiment in the configuration of the rear main body 32A of the rear bag portion 32. The rear main body 32A is formed such that the circumferential length of a portion inside of the strap 60 in the vehicle width direction is longer than the circumferential length of a portion outside of the strap 60 in the vehicle width direction when the level at which the strap 60 is positioned in the inflated and deployed state of the side airbag 20 is seen in a plan cross-sectional view. In other words, the length of a portion 26A1 between the front-rear partition section 33 and the rear end portion of the rear main body 32A in the one side portion 26A of the base cloth is set longer than the length of a portion 26B1 between the front-rear partition section 33 and the rear end of the rear main body 32A in the other side portion 26B of the base cloth 26.

In this embodiment, an increase in the capacity of the rear bag portion 32 can be restricted, and the inflation width of the rear main body 32A in the vehicle width direction can be enlarged at the same time. As a result, the rear main body 32A can more rapidly contact with the rear half of the chest C of the occupant P, thus allowing an effective improvement in the initial occupant restraining performance of the side airbag 20.

Fifth Embodiment

Figure 8:
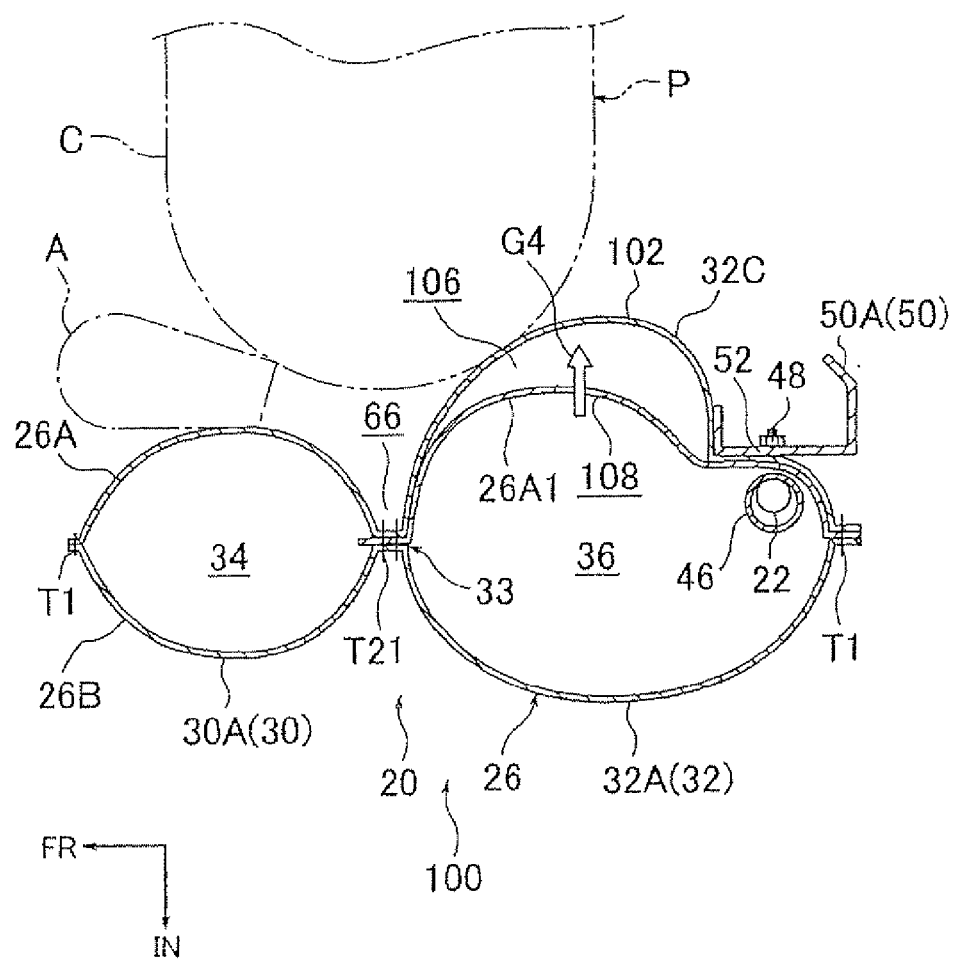
FIG. 8 is a cross-sectional view corresponding to FIG. 3 and showing a partial configuration of a side airbag device for a vehicle in accordance with a fifth embodiment of the present invention.

FIG. 8 shows a partial configuration of a side airbag device 100 for a vehicle in accordance with a fifth embodiment of the present invention by a cross-sectional view corresponding to FIG. 3. In this embodiment, the strap 60 in accordance with the first embodiment is omitted. The inflation width of the rear main body 32A in the vehicle width direction is set such that the front-rear partition section 33 faces the central portion in the fore-and-aft direction on the side surface of the chest C of the occupant P in the inflated and deployed state of the side airbag 20.

Further, in this embodiment, the inflation width of the rear main body 32A in the vehicle width direction is set shorter than that of the first embodiment, and a cloth material 102 separate from the base cloth 26 is provided inside (occupant P side) of the rear main body 32A in the vehicle width direction. The cloth material 102 is sewn to the base cloth 26 in the seams T12, T21, T22 (the seams T12, T22 are not shown in FIG. 8). Further, an upper edge portion of the cloth material 102 is sewn to the one side portion 26A of the base cloth 26 in a seam (not shown) that extends from the rear end portion of the seam T11 (see FIG. 2) toward the vehicle rear and reaches the rear end portion of the rear main body 32A.

Accordingly, an inside sub-bag portion 32C is formed inside of the rear main body 32A in the vehicle width direction. The inside sub-bag portion 32C constitutes the rear bag portion 32 together with the rear main body 32A and the front extension portion 32B. The inside sub-bag portion 32C is separated from the rear main body 32A by a right-left partition section 26A1 that is a portion constituting the rear main body 32A in the one side portion 26A. An inside of the inside sub-bag portion 32C serves as an inside chamber 106. The inside chamber 106 communicates with the rear chamber 36 via a right-left communication opening 108 formed in the right-left partition section 26A1. The gas supplied from the inflator 22 to a rear chamber 36 is supplied to the inside chamber 106 via the right-left communication opening 108 (see arrow G4 in FIG. 8). The opening area of the right-left communication opening 108 is set larger than that of the front-rear communication opening 38 (see FIG. 2).

In this embodiment, in the inflated and deployed state of the side airbag 20, the rear main body 32A restricts the position of the front-rear partition section 33 in the vehicle fore-and-aft direction, and the inside sub-bag portion 32C is inflated and deployed inward of the rear main body 32A in the vehicle width direction. Accordingly, the inflation width of the rear bag portion 32 in the vehicle width direction is enlarged. In other words, in this embodiment, an inflation width enlarging section is configured with the rear main body 32A and the inside sub-bag portion 32C. As described above, because the inside sub-bag portion 32C is inflated and deployed inward of the rear main body 32A in the vehicle width direction, the inside sub-bag portion 32C can rapidly contact with the rear half portion of the chest C of the occupant P. This allows an improvement in the initial occupant restraining performance of the side airbag 20.

Further, in this embodiment, the inside sub-bag portion 32C is formed by sewing the separate cloth material 102 to the base cloth 26 that constitutes the rear main body 32A. Accordingly, when restraining force on the rear half portion of the chest C is adjusted according to the type of a vehicle in which the side airbag device 100 is installed, the size of the cloth material 102 is changed, and the capacity of the inside sub-bag portion 32C can thereby be changed. Consequently, the base cloth 26 can commonly be used among a plurality of vehicle types, thus enabling more efficient production and cost reduction.

In addition, in this embodiment, the opening area of the right-left communication opening 108 is set larger than that of the front-rear communication opening 38. This allows rapid supply of gas to the inside chamber 106 and thereby allows rapid inflation and deployment of the inside sub-bag portion 32C. Accordingly, the inside sub-bag portion 32C can more rapidly restrain the rear half portion of the chest C.

Sixth Embodiment

Figure 9:
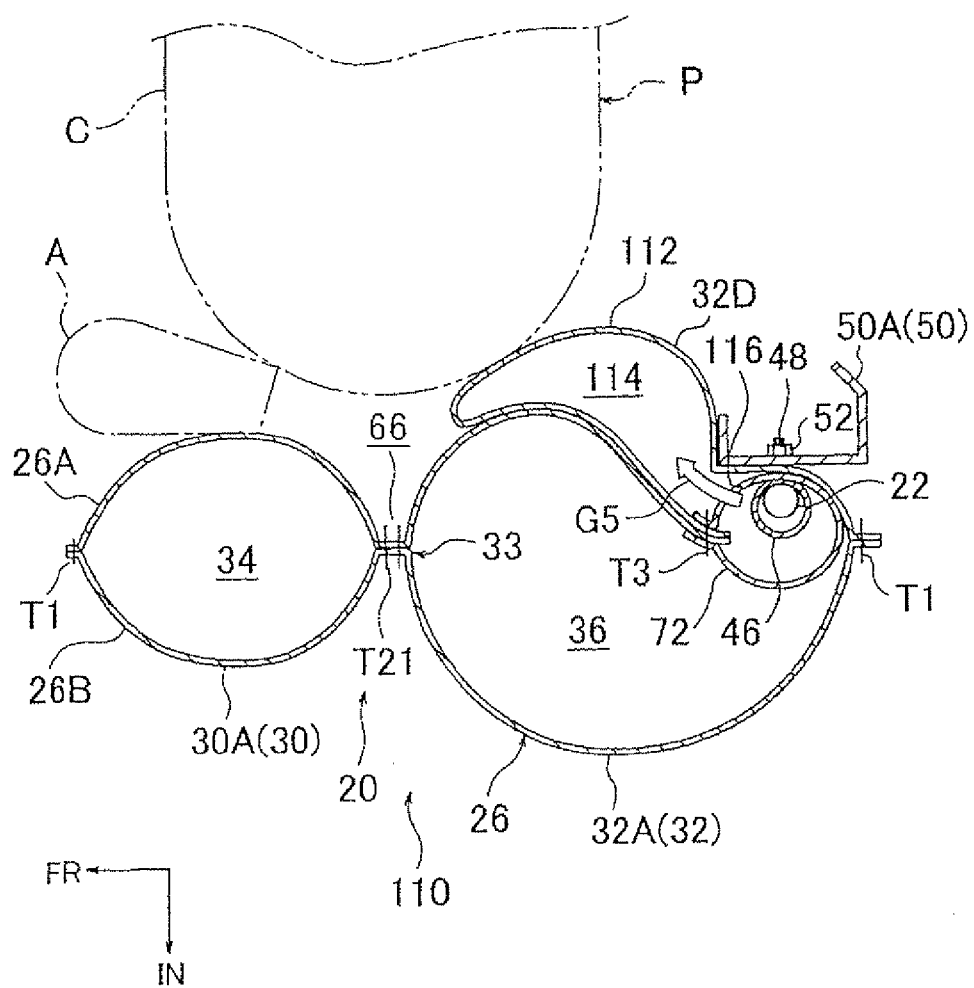
FIG. 9 is a cross-sectional view corresponding to FIG. 3 and showing a partial configuration of a side airbag device for a vehicle in accordance with a sixth embodiment of the present invention.

FIG. 9 shows a partial configuration of a side airbag device 110 for a vehicle in accordance with a sixth embodiment of the present invention by a cross-sectional view corresponding to FIG. 3. In this embodiment, the strap 60 in accordance with the first embodiment is omitted in the same way as the fifth embodiment. In addition, the inflation width of the rear main body 32A in the vehicle width direction is set such that the front-rear partition section 33 faces the central portion in the fore-and-aft direction on the side surface of the chest C of the occupant P in the inflated and deployed state of the side airbag 20.

Further, this embodiment includes the straightening cloth 72 same as the straightening cloth 72 in accordance with the second embodiment, a rear end portion of the one side portion 26A of the base cloth 26 is sewn to the straightening cloth 72 in the seam T3. Moreover, one end portion of base cloth 112 that constitutes an inside sub-bag portion 32D is sewn to the seam T3, and the other end portion of the base cloth 112 is sewn to the rear end portion of the rear main body 32A in the seam T1. The inside sub-bag portion 32D constitutes the rear bag portion 32 together with the rear main body 32A and the front extension portion 32B. An inside of the inside sub-bag portion 32D serves as an inside chamber 114, and the inside chamber 114 communicates with an inside of the straightening cloth 72 via an inside communication opening 116 formed in the straightening cloth 72. Therefore, when the inflator 22 is actuated, gas is supplied through the inside communication opening 116 into the inside chamber 114 (see arrow G5 in FIG. 5). As a result, the inside sub-bag portion 32D is inflated and deployed inward of the rear main body 32A in the vehicle width direction.

In this embodiment, in the inflated and deployed state of the side airbag 20, the rear main body 32A restricts the position of the front-rear partition section 33 in the vehicle fore-and-aft direction, and the inside sub-bag portion 32D is inflated and deployed inward of the rear main body 32A in the vehicle width direction. Accordingly, the inflation width of the rear bag portion 32 in the vehicle width direction is enlarged. In other words, in this embodiment, an inflation width enlarging section is configured with the rear main body 32A and the inside sub-bag portion 32D. As described above, because the inside sub-bag portion 32D is inflated and deployed inward of the rear main body 32A in the vehicle width direction, the inside sub-bag portion 32D can rapidly contact with the rear half portion of the chest C of the occupant P. This allows an improvement in the initial occupant restraining performance of the side airbag 20.

In addition, in this embodiment, because gas G5 is directly supplied from the inflator 22 into the inside sub-bag portion 32D, an inflation and deployment time point of the inside sub-bag portion 32D is easily controlled, and the rear half portion of the chest C can more rapidly be restrained.

In the sixth embodiment, the rear main body 32A and the inside sub-bag portion 32D are integrally formed in a rear end portion of the side airbag 20. The present invention is not limited thereto, but the inside sub-bag portion may be completely independent of the rear main body.

Further, in the configuration of the sixth embodiment, the gas blowing out from the same single inflator 22 is distributed into the rear bag portion 32 and an inside sub-bag portion 32D. The present invention is not limited thereto, but an inflator that supplies gas into the rear bag portion and an inflator that supplies gas into the inside bag portion may be separately provided (the gas generating device may include a plurality of inflators).

Seventh Embodiment

Figure 10:
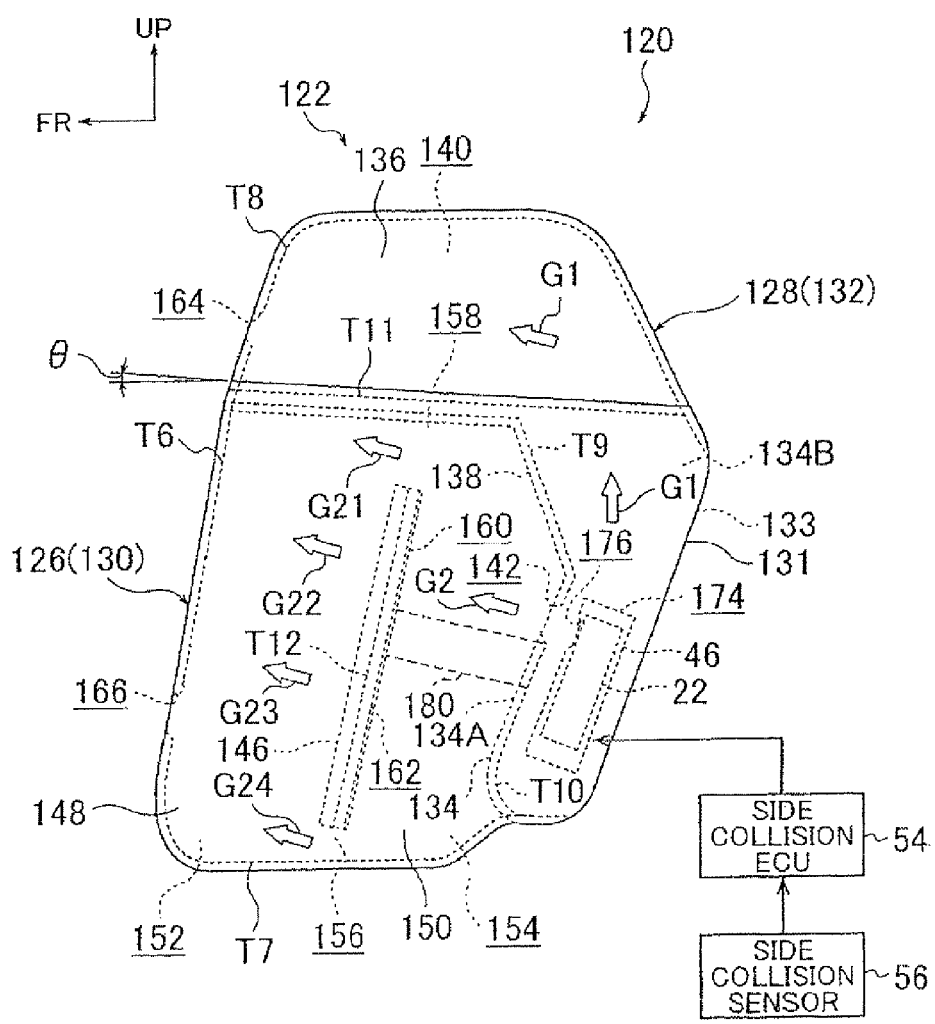
FIG. 10 is a side view corresponding to FIG. 2 and showing a configuration of main components of a side airbag device for a vehicle in accordance with the seventh embodiment of the present invention.

FIG. 10 shows a partial configuration of a side airbag device 120 for a vehicle in accordance with a seventh embodiment of the present invention by a side view corresponding to FIG. 2. In this embodiment, a configuration of a side airbag 122 is different from that of the side airbag 20 in accordance with the first embodiment.

The side airbag 122 is configured with a main bag portion 126 and a sub-bag portion 128. In the main bag portion 126, a single piece of base cloth 130 formed of a cloth material same as the base cloth 26 is doubled along a fold line 131, and a peripheral portion of the main bag portion 126 is sewn in seams T6, T7. Accordingly, the main bag portion 126 is formed into a bag whose one end side (upper end side in an inflated and deployed state) is open.

In the sub-bag portion 128, a single piece of base cloth 132 formed of a cloth material same as the base cloth 130 is doubled along a fold line 133, and a peripheral portion of the sub-bag portion 128 is sewn in seams T8, T9, T10. Accordingly, the sub-bag portion 128 is formed into a bag in a general inverted L-shape. The sub-bag portion 128 is configured with an inner tube portion 134 that extends in the height direction of the seat back (general vertical direction) in an inflated and deployed state, a shoulder bag portion (upper bag portion) 136 that extends from an upper end portion of the inner tube portion 134 toward the vehicle front, and a brace portion 138 that is inflated and deployed in a bracing manner between the inner tube portion 134 and the shoulder bag portion 136.

An inside of the shoulder bag portion 136 serves as a shoulder chamber 140. A lower side of the inner tube portion 134 serves as an inflator housing 134A for housing the inflator 22. Further, an upper side of the inner tube portion 134 serves as a gas introduction section 134B to the shoulder chamber 140. The gas introduction section 134B is formed such that its fore-and-aft dimension increases toward its upper end because of the provided brace portion 138. An inside of the inflator housing 134A communicates with the shoulder chamber 140 via the gas introduction section 134B. In addition, the brace portion 138 is configured such that its upper end is positioned on the vehicle front side of its lower end in the inflated and deployed state of the side airbag 122.

The inner tube portion 134 and the brace portion 138 are inserted in a rear end side in the main bag portion 126. In the above-described sub-bag portion 128, a lower end portion of the shoulder bag portion 136 is sewn to an upper edge of the main bag portion 126 in the seam T11. Accordingly, the main bag portion 126 and the sub-bag portion 128 are integrally joined, and an upper end opening of the main bag portion 126 is blocked by the sub-bag portion 128.

An inside of the main bag portion 126 and an inside of the sub-bag portion 128 are defined by the seams T9, T10. However, a gas supply opening 142 is formed in a portion adjacent to a central portion of the inner tube portion 134 in the up and down direction. Accordingly, an inside of the inner tube portion 134 communicates with the inside of the main bag portion 126 (a rear chamber 154 described below) via the gas supply opening 142. A portion that is not sewn is provided between the seam T9 and the seam T10, thereby forming the gas supply opening 142.

A tether 146 that constitutes the front-rear partition section is provided inside the main bag portion 126. The tether 146 is formed with, for example, a cloth material same as the base cloth 130, 132 into a long rectangular shape, one long side edge portion is sewn to one side portion of a base cloth 130 in a seam which is not shown, and the other long side edge portion is sewn to the other side portion of the base cloth 130 in the seam T12. The tether 146 is provided to extend in the height direction of the seat back (general up and down direction) in the inflated and deployed state of the side airbag 122. The tether 146 defines the main bag portion 126 into a front bag portion 148 and a rear bag portion 150. An inside of the front bag portion 148 serves as a front chamber 152, and an inside of the rear bag portion 150 serves as a rear chamber 154. Further, the front chamber 152 and the rear chamber 154 are partitioned from each other by the tether 146 in the fore-and-aft direction.

However, a front-rear communication opening (gap) 156 is formed between a lower end portion of the tether 146 and a lower end portion of the main bag portion 126, and the front chamber 152 communicates with the rear chamber 154 via the front-rear communication opening 156. Similarly, a front-rear communication opening (gap) 158 is formed between an upper end portion of the tether 146 and the shoulder bag portion 136, and the front chamber 152 communicates with the rear chamber 154 via the front-rear communication opening 158.

In addition, a plurality of (two in this case) circular communication openings (vent openings) 160, 162 are formed along the up and down direction (longitudinal direction) in the tether 146. The front chamber 152 communicates with the rear chamber 154 via the front-rear communication openings 160, 162.

Further, a vent hole (shoulder chamber air outlet) 164 that allows communication between the shoulder chamber 140 and an outside of the side airbag 122 is formed on a lower side of a front edge of the shoulder bag portion 136. A portion that is not sewn is provided between the seam T8 and the seam T9, thereby forming the vent hole 164.

Similarly, a vent hole (front chamber air outlet) 166 that allows communication between the front chamber 152 and the outside of the side airbag 122 is formed on a lower side of a front edge of the front bag portion 148. A portion that is not sewn is provided between the seam T6 and the seam T7, thereby forming the vent hole 166. In the inflated and deployed state of the side airbag 122, the vent hole 166 is arranged downwardly offset from the lower front-rear communication opening 162 formed in the tether 146 and arranged in a position upwardly offset from the front-rear communication opening 156.

Meanwhile, the inflator 22 and the diffuser 46 are housed in the above-described inflator housing 134A. The stud bolts 48 passing through the base cloth 130, 132 and the side frame 50A is screwed into the nuts 52, thereby fastening and fixing the inflator 22 and the diffuser 46 to the side frame A. In this embodiment, the diffuser 46 is formed into a cylindrical shape having a bottom, and the lower end opening of the diffuser 46 is thereby blocked. Gas outlets 174, 176 are formed in positions facing an upper end portion of the diffuser 46 and the gas supply opening 142, respectively, in the diffuser 46.

When the inflator 22 is actuated, the gas blowing out from the inflator 22 blows out from the gas outlets 174, 176 of the diffuser 46. Gas G1 blowing out from the gas outlet 174 is supplied to the shoulder chamber 140 through the gas introduction section 134B of the inner tube portion 134. Accordingly, the shoulder bag portion 136 is rapidly inflated and deployed.

Meanwhile, gas G2 blowing out form the gas outlet 176 of the diffuser 46 is supplied to the rear chamber 154 through the gas supply opening 142 of an inner tube portion 134. Accordingly, the rear bag portion 150 is rapidly inflated and deployed. Further, the gas G2 supplied to the rear chamber 154 is supplied to the front chamber 152 through the front-rear communication openings 158, 156, 160, 162 (see arrows G21, G22, G23, G24). Accordingly, the front bag portion 148 is rapidly inflated and deployed.

In the inflated and deployed state, the side airbag 122 is interposed between the occupant P and the door trim of the side door. In this state, the shoulder bag portion 136 is inflated and deployed such that it extends from the lateral side of the shoulder S of the occupant P toward the vehicle front. The front bag portion 148 and the rear bag portion 150 are inflated and deployed to be aligned along the fore-and-aft direction below the shoulder bag portion 136. Further, in this state, the shoulder bag portion 136 extends from an upper portion of the seat back 14 (the upper portion in a case where the seat back 14 is divided into three portions of upper portion, intermediate portion in the vertical direction, and lower portion) toward the vehicle front. Moreover, the front bag portion 148 is inflated and deployed on the lateral side of the front half portion of the chest C and the abdomen B of the occupant P, and the rear bag portion 150 is inflated and deployed on the lateral side of the rear half portion of the chest C and the abdomen B of the occupant P.

Here, in this embodiment, a strap 180 as an extending member (inflation width enlarging section) is provided in a strap 180. The strap 180 is in a configuration same as the strap 60 in accordance with the first embodiment. A rear end portion of the strap 180 is sewn to a front end portion of the inflator housing 134A in the seam T10, and a front end thereof is sewn to the tether 146 in a seam which is not shown. In other words, the strap 180 is stretched between both front and rear end portions of the rear bag portion 150. The strap 180 is disposed such that it is positioned in a portion adjacent to a central portion of the rear bag portion 150 in the up and down direction while the longitudinal direction of the strap 180 is aligned along the fore-and-aft direction in the inflated and deployed state of the side airbag 122. The strap 180 is extended in the fore-and-aft direction, thereby restricting inflation of the rear bag portion 150 in the vehicle fore-and-aft direction. As a result, the position of the tether (front-rear partition section) 146 in the vehicle fore-and-aft direction is restricted, and the inflation width of the rear bag portion 150 in the vehicle width direction is enlarged. Further, in this embodiment, the shoulder bag portion 136 functions in the same way as the front extension portion 32B in the first embodiment. Accordingly, this embodiment provides basically the same operation and effect as the first embodiment.

In the foregoing, the present invention has been described with descriptions of a plurality of embodiments. However, the present invention is not limited thereto but can be practiced with various modifications. It is matter of course that the scope of the claims is not limited by the above embodiments.

What is claimed is:

1. A side airbag device for a vehicle, comprising:
a gas generating device which is actuated to generate gas;
a side airbag in which a front bag portion and a rear bag portion are defined by a front-rear partition section having a front-rear communication opening, gas supplied from the gas generating device into the rear bag portion is supplied into the front bag portion through the front-rear communication opening to allow the side airbag to be inflated and deployed from an outside portion in a vehicle width direction of a seat back of a vehicle seat, and the front bag portion is arranged on a vehicle front side of the rear bag portion in an inflated and deployed state; and
an extending member which is provided in the rear bag portion and extended in the inflated and deployed state to restrict inflation of the rear bag portion in a vehicle fore-and-aft direction and thereby enlarges the inflation width of the rear bag portion in the vehicle width direction.

2. The side airbag device for a vehicle according to claim 1, wherein when a level at which the extending member is positioned in the inflated and deployed state is seen in a plan cross-sectional view, a circumferential length of a portion of the rear bag portion inside of the extending member in the vehicle width direction is longer than a circumferential length of a portion of the rear bag portion outside of the extending member in the vehicle width direction.

3. The side airbag device for a vehicle according to claim 1, wherein the rear bag portion includes a rear main body which is positioned on a vehicle rear side of the front bag portion in the inflated and deployed state and a front extension portion which extends from an upper portion of the rear main body toward the vehicle front and arranged above the front bag portion, and
the extending member is provided in the rear main body.

4. A side airbag device for a vehicle, comprising:
a gas generating device which is actuated to generate gas; and
a side airbag in which a rear main body which is included in a rear bag portion and a front bag portion are partitioned from each other by a front-rear partition section having a front-rear communication opening, an inside sub-bag portion and the rear main body that are included in the rear bag portion are defined by a right-left partition section having a right-left communication opening, gas supplied from the gas generating device into the rear main body is supplied to the front bag portion through the front-rear communication opening and supplied into the inside sub-bag portion through the right-left communication opening to allow the side airbag to be inflated and deployed from an outside portion in a vehicle width direction of a seat back of a vehicle seat toward a vehicle front, the front bag portion is arranged on a vehicle front side of the rear main body in an inflated and deployed state, and the inside sub-bag portion is arranged inside of the rear main body in the vehicle width direction.

5. The side airbag device for a vehicle according to claim 4, wherein the inside sub-bag portion is formed by sewing a separate cloth material to base cloth which constitutes the rear main body.

6. The side airbag device for a vehicle according to claim 4, an opening area of the right-left communication opening is set larger than an opening area of the front-rear communication opening.

7. A side airbag device for a vehicle, comprising:
a gas generating device which is actuated to generate gas; and
a side airbag in which a rear main body which is included in a rear bag portion and a front bag portion are partitioned from each other by a front-rear partition section having a front-rear communication opening, gas supplied from the gas generating device into the rear main body is supplied into the front bag portion through the front-rear communication opening to allow the side airbag to be inflated and deployed from an outside portion in a vehicle width direction of a seat back of a vehicle seat toward a vehicle front, the front bag portion is arranged on a vehicle front side of the rear main body in an inflated and deployed state, and an inside sub-bag portion to which gas is directly supplied from the gas generating device and which is inflated and deployed inward of the rear main body in the vehicle width direction is provided in the rear bag portion.

8. A side airbag device for a vehicle, comprising:
a gas generating device which is actuated to generate gas; and
a side airbag in which a front bag portion and a rear bag portion are defined by a front-rear partition section having a front-rear communication opening, gas supplied from the gas generating device into the rear bag portion is supplied into the front bag portion through the front-rear communication opening to allow the side airbag to be inflated and deployed from an outside portion in a vehicle width direction of a seat back of a vehicle seat, and the front bag portion is arranged on a vehicle front side of the rear bag portion in an inflated and deployed state; and
an inflation width enlarging section which is provided in the side airbag, restricts a position of the front-rear partition section in a vehicle fore-and-aft direction in the inflated and deployed state, and enlarges an inflation width of the rear bag portion in the vehicle width direction.

* * * * *